May 4, 1948.   J. L. CLOUGH   2,440,797
STROBOSCOPIC INDEX AND METHOD OF INDEX VIEWING
Filed April 29, 1944   2 Sheets-Sheet 1
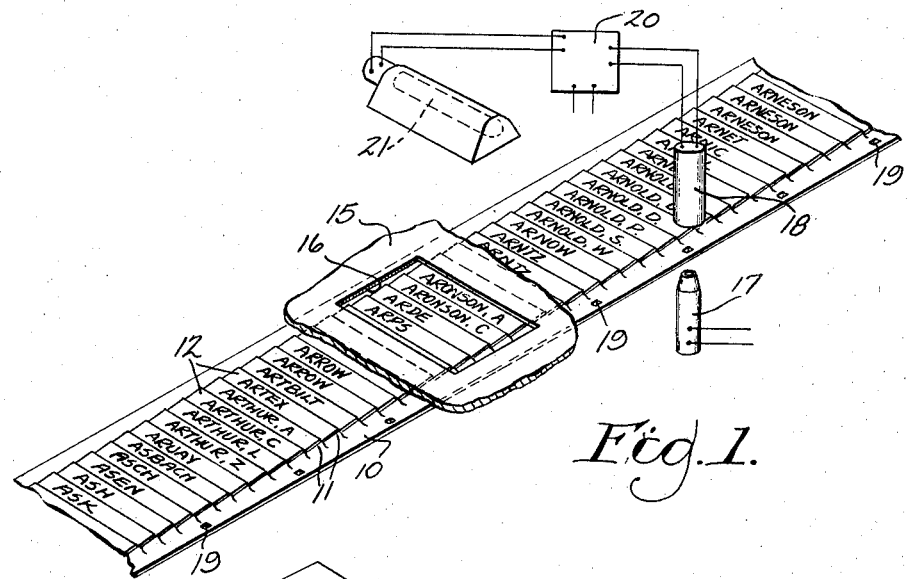
Fig. 1.
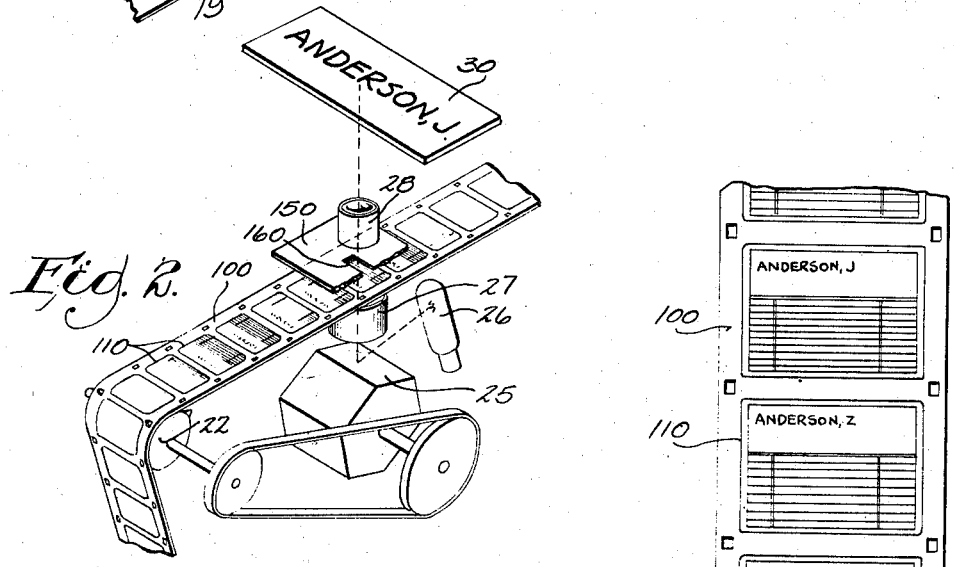
Fig. 2.
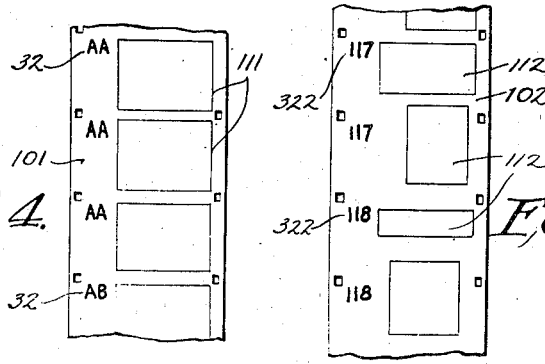
Fig. 4.
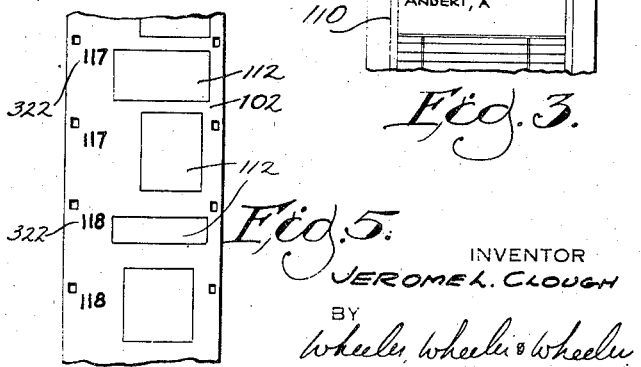
Fig. 3.
Fig. 5.
INVENTOR
JEROME L. CLOUGH
BY
Wheeler, Wheeler & Wheeler
ATTORNEYS.

May 4, 1948. J. L. CLOUGH 2,440,797
STROBOSCOPIC INDEX AND METHOD OF INDEX VIEWING
Filed April 29, 1944 2 Sheets-Sheet 2

INVENTOR
JEROME L. CLOUGH
BY
Wheeler, Wheeler & Wheeler
ATTORNEYS.

Patented May 4, 1948

2,440,797

UNITED STATES PATENT OFFICE 2,440,797

STROBOSCOPIC INDEX AND METHOD OF INDEX VIEWING

Jerome L. Clough, Milwaukee, Wis.

Application April 29, 1944, Serial No. 533,318

23 Claims. (Cl. 88—14)

This invention relates to a stroboscopic index and methods for index viewing.

Where records for direct viewing or projection or display are mounted on a conveyor or web for convenient storage and delivery to a point of inspection, the desirability of rapid movement of the records to the point of inspection is in some measure incompatible with the desirability of arresting the record movement as precisely as possible upon the arrival of a desired record at such point.

It is the object of the present invention to provide stroboscopic index means whereby the progress of the web or conveyor upon which the record is mounted or carried may be watched without eye strain and with considerable accuracy during high speed movement of the web or conveyor. From the broad aspect of this objective, it is immaterial whether the index is numerical or alphabetical; whether it is viewed directly or by projection; whether it is a separate index or made up of parts of the records themselves; whether it applies to a single record or a group of records; whether the medium is transparent or opaque; and whether the stroboscopic effect is created by a shutter, a flashing light, a moving mirror or prism, or otherwise. Examples of all of the foregoing will be disclosed as a part of the disclosure of the broad invention here involved.

For many specific purposes of the present invention, it is an important object of the invention to be able to use one or more of the foregoing features or instrumentalities separately; for other purposes, it is advantageous to be able to make different combinations of the foregoing features or instrumentalities.

Specifically, it is an important object of the invention to be able to make up an index which will vary with every variation in the records themselves by reason of the fact that portions of the records are used as parts of the stroboscopic index.

Other objects of the invention will be apparent from the following disclosure wherein some of the many possibilities are diagrammatically suggested.

In the drawings:

Fig. 1 is a fragmentary diagrammatic view in perspective illustrating one embodiment of the invention.

Fig. 2 is a fragmentary diagrammatic view in perspective illustrating a second embodiment of the invention.

Fig. 3 is an enlarged fragmentary detailed view in plan showing a detail of the record carrier used in the device of Fig. 2.

Fig. 4 and Fig. 5 are views on a somewhat reduced scale as compared with Fig. 3 showing other types of record carriers alternatively usable in the device of Fig. 2.

Like parts are identified by the same reference characters throughout the several views.

Figure 6:
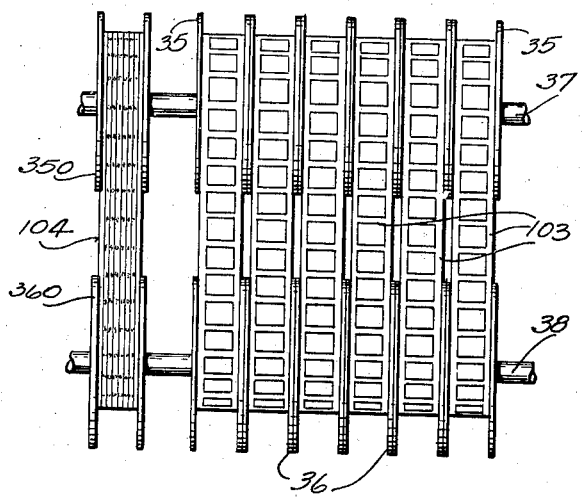
Fig. 6 is a fragmentary detail view in front elevation showing another embodiment of the invention.

In the construction shown in Fig. 1, the carrier 10 comprises a belt having pockets 11 in which are mounted cards 12 which so lap on the conveyor 10 that the top margin of each card is exposed. The cards may carry any desired records pertaining to the party whose name appears on the exposed margin.

The mask 15 has an opening at 16 exposing one or more names.

If the operator were to attempt to read the names individually during the movement of the conveyor 10 in order to determine the arrival of a desired card at a selected inspection station, the conveyor would have to be operated so slowly as to be impracticable for commercial purposes. The eye strain would also be severe. If the conveyor were operated at commercially practicable speeds, the names would blur.

However, by using the stroboscopic principle to view individual names on the card at selected intervals, the only letters which would blur would be the letters changing in such names. In so far as the letters of the names on a succession of cards so viewed remain identical, the operator will get the impression that he is viewing such letters without movement. The stroboscopic principle is known, having been used either to give the appearance of completely arresting the movement of a piece of machinery or, to give the impression of slowing such movement to so moderate a speed as to make it possible for the operator to watch it as if it were in fact moving at slow speed.

By applying that principle to an index, the card movement may either be completely arrested or slowed as desired, depending on whether the flash of light by which the individual cards are viewed is in perfect registry with the arrival of the respective names at the reviewing station, or whether successive cards which are viewed are progressively slightly advanced with respect to a predetermined viewing position at the viewing station.

The stroboscopic effect may be established in a variety of ways. In the exemplification shown in Fig. 1, it is brought about by a flashing light and complete, apparent arrest of movement is achieved because of the means employed to positively synchronize the flash with the arrival of each viewed name at the selected station.

Obviously, there are a multitude of ways by which the light may be synchronized, or substantially synchronized, with the movement of the index or record. The mechanism selected to exemplify this embodiment is one including a lamp house at 17 and a photoelectric cell at 18 from which the light from source 17 is normally excluded by the side margin of the conveyor 10 but which receives light at intervals upon the registry of one of the openings 19 with the line of light emission between light source 17 and the cell 18. The photoelectric cell is connected through the usual energizing unit 20 to the lamp 21 which will ordinarily be a lamp of the gaseous emission type in order to the capable of instant response. Every time one of the openings 19 passes between the light source and the photoelectric cell, the lamp 21 will flash. The mask 15 will, at the moment of the flash, be framing one or more names on the margin of one or more cards 12 within the field of illumination provided by the flash and, as previously explained, so far as the letters of names consecutively so exposed by successive flashes are identical, the operator will read these letters as if they were stationary. Only letters which are different in cards successively so illuminated will be blurred. In a comprehensive index, the number of letters which will appear stationary will be enough to enable the operator to determine the approximate position at which the desired record will be reached for inspection. Accordingly, the operator will be able to slow or completely stop the movement of the conveyor as the desired record approaches or reaches the inspection station.

It will, of course, be understood that the conveyor web carrying the records may be operated by hand or power in any desired manner. The patent to Harding 1,845,410 shows hand operation, while the patent to Rinaldy 2,265,859 shows power operation. Among numerous other patents disclosing record selecting devices in which the problem is present are Emerson 2,280,750 and Holbrook 2,254,368. The operating means per se being old, no disclosure thereof is made here, but it will be understood that whatever operating means is employed, the record carrier can be operated at high speed while the operator keeps track of its progress by watching the stroboscopic index whereby, without eye strain, he is able to see the first two, three or more letters of the key names apparently stationary, so that as the record approaches the point of inspection, he can either slow or stop the carrier.

That the records need not be opaque and that the stroboscopic means may be operated otherwise than as above described, is made clear in Fig. 2 where the carrier web 100 comprises a film of the type used in making motion pictures. Each frame 110 will bear the photographic reproduction of an individual record and the records may be enlarged for inspection either by a direct viewing lens or by projection.

By way of exemplification, I have shown a shutterless projection system for creating the stroboscopic effect. The margin of the film 100 is conventionally apertured to mesh with the usual sprocket 22 which is connected to rotate in synchronism with the film a faceted mirror or prism 25 which reflects light from the lamp or source 26 through a lens 27 and the film and past a mask 150 to the lens 28 whereby the image on the film is projected in enlarged form on to a screen at 30.

The operation corresponds to that already described. In this instance, although the frames 110 may contain a reproduction of an entire record, as shown in detail in Fig. 3, the slot 160 in the mask 150 is of such limited extent that only the name at the top of the record will be projected by the momentary flash of light delivered in the rotation of the prism through the lens system to the screen. Accordingly, the operator watching the screen will see index letters which, in a succession of flashes, will appear to be stationary on the screen (or in very slow movement, according to the timing), all of the letters duplicated in successive names being clear and only the ones which are changing appearing blurred.

Means for viewing the entire record is old and well known as shown in several of the patents above identified. Therefore, the disclosure in Fig. 2 is limited to a disclosure of the means by which a stroboscopic index is provided. It will be understood that when the index shows that the desired record is approaching the inspection station, the movement of the film or web record carrier will be arrested and the desired record viewed in any appropriate manner.

Fig. 4 and Fig. 5 show alternative arrangements of the index and illustrate the fact that instead of using the name appearing on the record as a part of the index, it is also possible to establish a separate index on the record carrier. Assuming that the record carrier comprises film as indicated at 101 in Fig. 4, the reproduction of the records in appropriate frames 111 may be limited to the major portion of the film near the righthand side theerof, while a strip near the lefthand side is preserved for a separate index, as indicated at 32.

The experience of telephone companies and others in the listing of names indicates that over considerable periods of time, despite fluctuations in individual names, there will be very little fluctuations in individual names, there will be very little fluctuation in the total proportion of names in each index classification. Accordingly, it is possible to print up strips of film in advance which bear index memoranda along a margin, as indicated in Fig. 4 and Fig. 5, thereafter printing the actual records on the film or web in sequence with the assurance that the index symbols will at least approximately locate the desired records. This saves the time which would otherwise be involved in correlating each record with a particular index symbol or set of symbols.

Where the records are irregular, the carrier 102 may have the records reproduced at random, as indicated at 112 in Fig. 5 and the index, in any of the carriers disclosed may, as exemplified by Fig. 5, be numerical rather than alphabetical, the numerical index symbols being designated in Fig. 5 by reference character 322.

Figure 7:
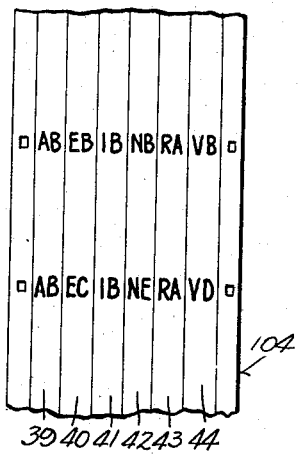
Fig. 7 is an enlarged fragmentary detailed view of an index carrier of the type shown in Fig. 6.

Instead of using parts of the original records themselves to provide the stroboscopic index as in Figs. 1, 2 and 3, or instead of providing a separate index strip beside the records on a single carrier, as in Figs. 4 and 5, I may, in any of the devices disclosed, provide a separate stroboscopic index carrier movable concurrently with the record carrier as suggested in Figs. 6 and 7. In these views, as in the Harding patent above identified, the records on films are wound on to reels 35 and 36 which are mounted in gangs on the respective shafts 37 and 38 so that the carrier films 103 may, by appropriate rotation of the respective shafts, be unwound concurrently from the reels of one shaft and wound concurrently on to the reels of the other shaft.

For the purposes of this invention, a separate carrier film 104 is wound in like manner between the reels 350 and 360 mounted on or connected with the shafts 37 and 38 to operate proportionately. Thus, as the record carrying webs 103 move across the inspection station, the index carrying web 104 will have a corresponding movement across its inspecting station. If desired, a single index may be used for all of the several films 103 but I prefer that the carrier 104 should have separate indexes for each of the several films 103, as indicated in Fig. 7 where the carrier strip 39 provides an index for the first of the record webs 103 while carrier strips 40, 41, 42, 43 and 44 provide individual indexes for the remaining record carriers 103. In Fig. 6, no means for the stroboscopic examination of the index carrier 104 is shown, but it will be understood that in any of these devices any stroboscopic lighting system and any desired optical system may be used interchangeably, subject only to the qualification that where the carrier is opaque it naturally cannot be viewed by transmitted light, but must be viewed by reflected light.

Figure 8:
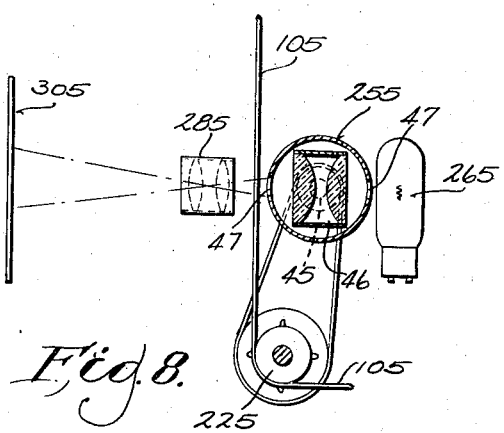
Fig. 8 is a fragmentary detailed view in transverse section illustrating an alternative means for creating the stroboscopic effect.

Fig. 8 exemplifies an optical system usable with any transparent or film type index carrier. The carrier is shown at 105 and may be identical with the carrier shown at 100, 101, 102 or 104. It is preferably perforated to assure the synchronous operation of the shutter 255 which may comprise a cylinder closed at one end for mounting on the shaft 45. This shutter may have mounted stationary within it a condensing lens 46 in an optical system which includes a light source 265 and a projection lens 285 and a screen 305. The shutter has axially extending slots at 47 at diametrically opposite points in its periphery so that twice in each rotation these slots line up along the axis of light transmission in the optical system, thereby permitting a flashing light to pass through the carrier film 105 to the screen, whereby the stroboscopic index may be read and followed. As shown, the sprocket 225 makes one-fourth turn for each frame of the film 105 and the driving connections to the shutter shaft 45 are such that the shutter makes one-half turn per frame, thus separately illuminating each successive frame. Regardless of whether the frames of the carrier 105 are used exclusively for the index as in Fig. 7, or also carry the record, as in Figs. 3, 4, 5 and 9, in any event, the index may be followed stroboscopically.

Figure 9:
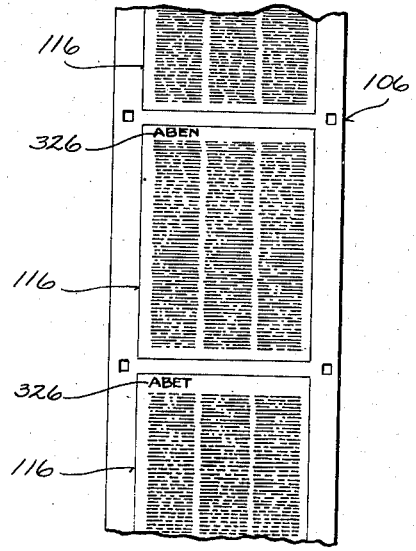
Fig. 9 is a fragmentary detailed view in plan showing a modified type of an index and record carrier.

Fig. 9 shows an arrangement somewhat similar to Fig. 3 but illustrating how entire groups of records may be identified with a single index indication. In the carrier 106, each frame 116 may carry a photographic reproduction of an entire page of a telephone or other directory headed, for example, by an index symbol 326.

Figure 10:
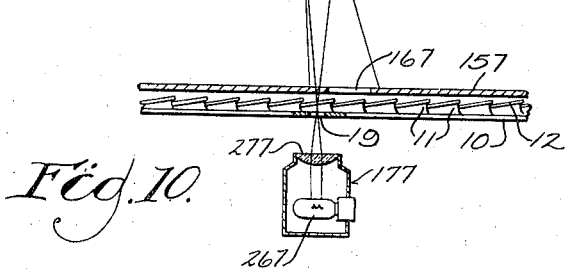
Fig. 10 is a detail view in section showing a modified embodiment of my invention.

Fig. 10 shows an arrangement very similar to Fig. 1. The carrier 10 with its pockets and the individual cards 12 therein are identical with those previously disclosed. However, instead of using at 17 a lamp which functions only to energize the source 21 actually used for illumination, I have, in Fig. 10, done away with the intermediate photoelectric cell and used the carrier belt or web 10 as a shutter directly in the optical system.

The lamp house 177 contains the usual projection bulb 267 and a condensing lens 277 by which the light is brought to a focus at approximately the plane in which the carrier web 10 moves. Thus focused, the beam of light will pass with substantially undiminished intensity for a brief moment through any one of the apertures 19 of the carrier belt which registers with it. Beyond such aperture, the light will diverge and, upon being reflected by the mirror 217, the beam will have become sufficiently spread out to illuminate the entire field exposed by the window 167 in the mask 157, the window, in this instance, being sufficiently large to expose but a single name in the margin of a single card 12.

By way of recapitulation, it is desired to emphasize the fact that I regard as particularly significant the arrangements wherein portions of the records themselves are made to furnish their own index. The names upon the individual cards 12 in Figs. 1 and 10 and upon the individual frames in the film of Figs. 2 and 3 are examples.

It is also desired to reiterate that the component elements herein severally disclosed by way of exemplification are interchangeable with each other. The device of Figs. 1, 2, 3 and 10 may have numerical index symbols instead of name symbols. The light which gives the stroboscopic illumination in Fig. 1 may be caused to flash by a prism as in Fig. 2 or a rotary shutter as in Fig. 8. Or the light flashing devices of Fig. 1 or Fig. 8 or Fig. 10 may be substituted for that shown in Fig. 2. Even though the record carrier comprises a film upon which the records appear in the form of photographic reproductions, the records may be viewed by reflected light, as in Fig. 1 and Fig. 10, instead of by transmitted light as in Fig. 2 and Fig. 8.

Moreover, while I have shown lenses for the magnification of the image where the image of the index symbols is to be viewed by projection, it will be understood that the lens system may be devised for direct viewing and the stroboscopic shutter or equivalent may be placed anywhere in the optical system where the desired stroboscopic effect will be produced. As shown, this may be between the source of illumination and the index or it may affect the source of illumination. Or it may be between the index and the observer's eye, with or without a magnifying or projecting lens.

While the present invention has to do primarily with the use of an observer's eye in scanning the index, it will be obvious that the method herein disclosed contemplates that the scanning may be done photoelectrically or photographically, if desired. As an example of the optical practice of the invention in this connection, I suggest the photographing of spaced names at predetermined intervals during the passage of a record carrier with the result that such names, when photographed in sequence, will, in themselves, constitute an index materially shorter than, and separable from, the record carrier.

I claim:

1. In a mechanical index, the combination with a carrier adapted for high speed operation past a predetermined inspection station, said carrier having a series of index symbols mounted on the carrier to move therewith past said station, said symbols progressively varying at a rate such that certain thereof are repeatedly duplicated, of a stroboscope operatively arranged to permit selected index symbols to be viewed at predetermined intervals, stroboscope operating means provided with driving connections with the carrier for synchronizing said stroboscope with the movement of said carrier, whereby to enable duplicated portions of successive symbols to be read stroboscopically in the course of uninterrupted carrier movement.

2. In a mechanical index, the combination with a carrier and a series of index symbols thereon, said carrier being adapted to move with said symbols at high speed past a predetermined viewing station, said symbols progressively varying at a rate such that certain thereof are repeatedly duplicated, of a stroboscopic illuminator, and stroboscope operating means provided with driving connections with the carrier for synchronizing said illuminator with said carrier sufficiently for viewing selected index symbols in the course of their movement on said carrier past said station.

3. In a device of the character described, the combination with a stroboscopic source of illumination comprising a lamp arranged to illuminate a predetermined field, and means for periodically exposing said field to the light of said lamp for brief intervals, of a carrier movable at high speed through said field having index notations on the carrier and progressively varying in predetermined sequence, certain series of notations having an appreciable number of symbols repeated in successive notations, said carrier having mechanical driving connections with said exposing means for synchronizing the flashes of light on said field with the passage of index notations through said field, whereby to enable the repetitive symbols in successive illuminated notations to be read stroboscopically.

4. The structure of claim 3 in which the carrier is provided with separate records of which the index notations comprise respective integral parts.

5. The structure of claim 3 in which the carrier is provided with separate records of which the index notations comprise respective integral parts, the respective records being individually removable bodily from the carrier.

6. The combination with a carrier, of record cards mounted thereon having lapping portions with exposed margins, an index notation identifying each record and disposed on the exposed margin thereof, said notations varying progressively and containing an appreciable number of symbols repeated in successive notations, a stroboscopic illuminator for the illumination of a predetermined field through which said carrier and records pass, said stroboscopic illuminator and carrier comprising timing means for synchronizing the stroboscopic illumination of said field with the passage of selected index notations therethrough, whereby to enable repetitive portions of said index notations to be read in the course of carrier movement.

7. The device of claim 6 in which the stroboscopic illuminator comprises an optical system and the carrier comprises a shutter in said system having light transmitting portions and opaque portions alternately passing through said system to control the stroboscopic illumination of said field.

8. The combination with a carrier having index notations comprising symbols progressive in sequence and at least some of which are repeated in successive notations, of a stroboscopic illuminator for periodically illuminating a field through which said carrier and its index notations are movable, said stroboscopic illuminator including shutter means and driving connections between the shutter means and carrier causing the shutter means to operate in synchronism with said carrier for periodically exposing said field to illumination.

9. The device of claim 2 in which the stroboscopic illuminator comprises a normally deenergized lamp, and means for the periodic momentary energization of the lamp for light emission.

10. The device of claim 2 in which the stroboscopic illuminator comprises a source of illumination energized with substantial continuity, and means connected with the driving connections for the carrier for periodically permitting light from said source to illuminate said field.

11. The device of claim 2 in which the stroboscopic illuminator comprises a source of illumination energized with substantial continuity, and means connected with the driving connections for the carrier for periodically causing light from said source to illuminate said field, said means comprising a pivotally movable reflector.

12. The device of claim 3 in which the carrier comprises a web having pockets and cards removably mounted in the respective pockets and having marginal portions exposed on which the index notations appear.

13. The device of claim 3 in which the carrier comprises a film having individual records carried thereon in the form of photographic images each having an index notation as a part of its respective image.

14. The device of claim 3 in which the carrier comprises a film having individual records carried thereon in the form of photographic images, each having an indexed notation associated with it on the film outside of the respective image.

15. The device of claim 1 in further combination with an optical system for viewing the index symbols spaced on said carrier and rendered visible by said stroboscope, said optical system including a lens.

16. The device of claim 1 in further combination with an optical system for viewing the index symbols spaced on said carrier and rendered visible by said stroboscope, said optical system including a lens, said stroboscope including means for periodically interrupting the transmission of light in said optical system, and means for periodically traversing said optical system with a beam of light carrying the image of a selected symbol.

17. The device of claim 1 in further combination with an optical system including a lens for magnifying the image of the successive index symbols viewed.

18. The method of moving at high speed to a predetermined point a record carrier and associated index containing repeated symbols progressively varying in predetermined sequence, which method includes the stroboscopic viewing of the index in the course of its high speed movement until observation of the repeated symbols shows that the progressive variation has so progressed as to approach said point, and arresting such movement upon approaching the desired point as determined by the stroboscopic viewing of the index.

19. The method of reading an index containing repeated symbols progressively varying in predetermined sequence which consists in moving the index at high speed through a predetermined viewing field and stroboscopically rendering selected spaced portions of the index visible at predetermined intervals in said field, synchronizing such intervals with index movement, and viewing the index as stroboscopically rendered visible.

20. The method of claim 19 in which the step of stroboscopically viewing selected portions of the index includes the intermittent passage of light to the index.

21. The method of claim 19 in which the step of stroboscopically viewing selected portions of the index includes the intermittent passage of light from the index.

22. The method of claim 19 in which the step of stroboscopically viewing selected portions of the index includes the intermittent emission of light for the purpose of such viewing.

23. A method of finding a predetermined record in a long sequence of records on a carrier having an index provided with progressively varying symbols in a series in which certain symbols are repeated, the repeated symbols progressively varying throughout the series, said method comprising moving the carrier at a speed above that at which normal reading of the records is possible stroboscopically scanning the repeated index symbols during carrier movement, and arresting the movement of the carrier when the progressive variation in the repeated symbols indicates that the desired record is at hand.

JEROME L. CLOUGH.

REFERENCES CITED

The following references are of record in the file of this patent:

UNITED STATES PATENTS

| Number | Name | Date |
| --- | --- | --- |
| 1,387,240 | Collis | Aug. 9, 1921 |
| 1,639,178 | Guillet | Aug. 16, 1927 |
| 1,735,100 | Wohlrabe | Nov. 12, 1929 |
| 1,804,453 | Basseches | May 12, 1931 |
| 1,848,520 | Eddison | Mar. 8, 1932 |
| 1,975,876 | Stern | Oct. 9, 1934 |
| 2,066,349 | Hellweg et al. | Jan. 5, 1937 |
| 2,017,653 | Clarke et al. | Oct. 15, 1935 |
| 2,124,802 | Wallace | July 26, 1938 |
| 2,138,096 | Hamlin | Nov. 29, 1938 |
| 2,251,998 | Goodale | Aug. 12, 1941 |
| 2,272,487 | Stone | Feb. 10, 1942 |
| 2,289,359 | Hansbarger | July 14, 1942 |